(12) United States Patent
Rothschild et al.

(10) Patent No.: US 8,567,132 B2
(45) Date of Patent: Oct. 29, 2013

(54) MODULAR SOLAR RACKING SYSTEM

(76) Inventors: Elie Rothschild, San Francisco, CA (US); John Humphrey, San Francisco, CA (US); George H. F. Schnakenberg, III, San Francisco, CA (US)

(*) Notice: Subject to any disclaimer, the term of this patent is extended or adjusted under 35 U.S.C. 154(b) by 921 days.

(21) Appl. No.: 12/710,328

(22) Filed: Feb. 22, 2010

(65) Prior Publication Data

US 2010/0212714 A1    Aug. 26, 2010

Related U.S. Application Data

(60) Provisional application No. 61/154,002, filed on Feb. 20, 2009.

(51) Int. Cl.
*E04D 13/18* (2006.01)

(52) U.S. Cl.
USPC ........... 52/173.3; 136/244; 136/251; D13/102

(58) Field of Classification Search
USPC .......... 52/173.3; 136/251, 244, 291; 257/433; 126/621, 622, 623; D13/102
See application file for complete search history.

(56) References Cited

U.S. PATENT DOCUMENTS

| | | | |
|---|---|---|---|
| 5,244,508 A | 9/1993 | Colozza | |
| 5,746,839 A | 5/1998 | Dinwoodie | |
| 5,969,501 A | 10/1999 | Glidden et al. | |
| 6,046,399 A | 4/2000 | Kapner | |
| 6,105,316 A * | 8/2000 | Bottger et al. | 52/173.3 |
| 6,201,181 B1 | 3/2001 | Azzam et al. | |
| 6,606,823 B1 | 8/2003 | McDonough et al. | |
| RE38,988 E | 2/2006 | Dinwoodie | |
| 7,230,819 B2 | 6/2007 | Muchow et al. | |
| 7,921,843 B1 * | 4/2011 | Rawlings | 126/623 |
| 2004/0250491 A1 * | 12/2004 | Diaz et al. | 52/518 |
| 2006/0266352 A1 | 11/2006 | Marston et al. | |
| 2007/0144575 A1 * | 6/2007 | Mascolo et al. | 136/246 |
| 2011/0108083 A1 * | 5/2011 | Ravestein et al. | 136/244 |
| 2012/0325294 A1 * | 12/2012 | Botkin et al. | 136/251 |

* cited by examiner

*Primary Examiner* — William Gilbert
(74) *Attorney, Agent, or Firm* — Patwrite Law; Mark David Torche

(57) ABSTRACT

A modular solar racking system comprises a plurality of modular solar rack supports that interconnect to provide a portable, non-invasive solar electrical generation system. One embodiment comprises a plastic modular solar rack support having a base portion, a ballast holding portion, a strut and a wedge portion. Supports are interconnected by fitting within grooves in the strut. Uni-strut frames are attached to the supports and solar panels are mounted thereon. In another embodiment, the supports comprise a base portion, a ballast holding portion, a forward lifting portion, a rearward lifting portion and a strut. Again, supports are interconnected by fitting within grooves disposed in the strut. The supports are stackable and are installed on-site using a torque wrench. Ballast may be used to hold the supports down. In one embodiment, a membrane is applied to the bottom surface which is used to adhere the support to a surface.

6 Claims, 20 Drawing Sheets

MODULAR SOLAR RACKING SYSTEM

CROSS REFERENCE TO RELATED APPLICATIONS

This application claims priority and herein incorporates by reference U.S. provisional patent application Ser. No. 61/154,002, filed Feb. 20, 2009.

BACKGROUND OF THE INVENTION

As alternative energy sources become more important to the economic and environmental well being of society, solar energy use will continue to increase. It is becoming more common to see roofs and other structures having solar panels installed to generate electrical energy. In general, these installations require significant rack systems that may be permanent. These kinds of installations can cause exposure problems to the building due to the required structural penetration to secure the solar panels. Additionally, it is difficult to remove if desired.

To solve this problem, some solar systems utilize racking systems that use ballast to secure them rather than permanent installations. Although this helps in removal and minimizing surface penetrations, it is difficult for such installations to meet strength, reliability, environmental and safety standards while also withstanding wind, rain, temperature variations and solar radiation. Additionally, these racking systems tend to be bulky and complex requiring expert installation done on-site.

There is a need for a solar racking system that is easy to install that does not require surface penetration that is also easily removed.

SUMMARY OF THE INVENTION

A modular solar racking system comprises a plurality of modular solar rack supports that interconnect to provide a portable, non-invasive solar electrical generation system. One embodiment comprises a plastic modular solar rack support having a base portion, a ballast holding portion, a strut and a wedge portion. Supports are interconnected by fitting within grooves in the strut. Uni-strut frames are attached to the supports and solar panels are mounted thereon. In another embodiment, the supports comprise a base portion, a ballast holding portion, a forward lifting portion, a rearward lifting portion and a strut. Again, supports are interconnected by fitting within grooves disposed in the strut. The supports are stackable and are installed on-site using a torque wrench. Ballast may be used to hold the supports down. In one embodiment, a membrane is applied to the bottom surface which is used to adhere the support to a surface.

Other features and advantages of the instant invention will become apparent from the following description of the invention which refers to the accompanying drawings.

DETAILED DESCRIPTION OF THE INVENTION

Figure 1:
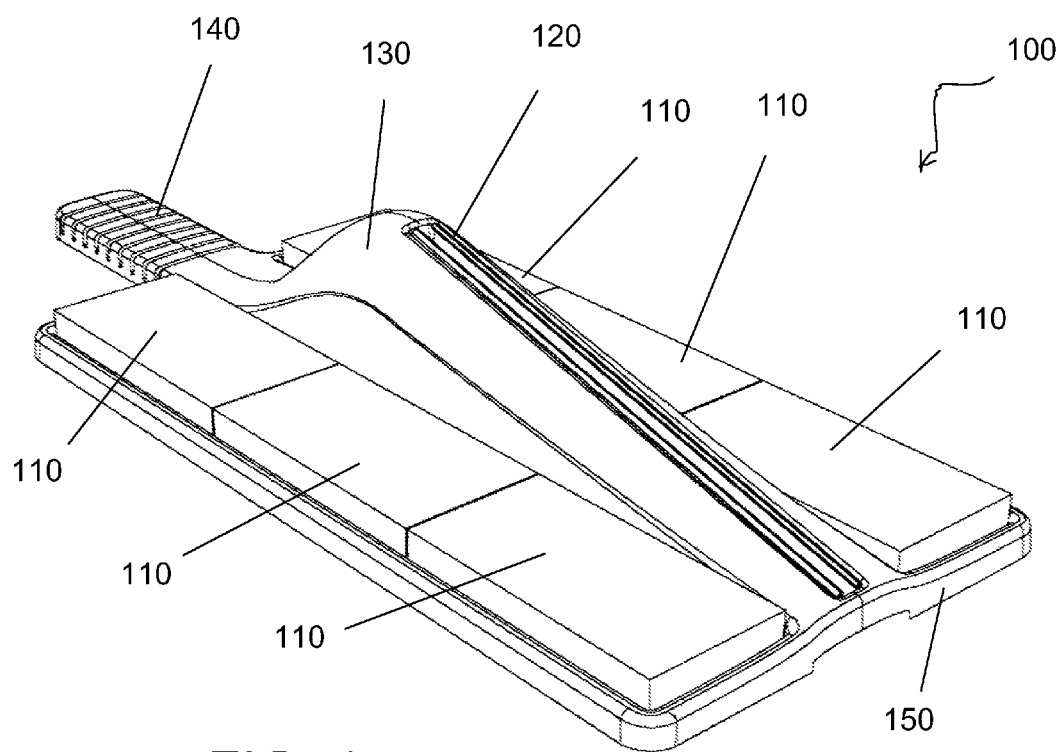
FIG. 1 is a perspective drawing of a modular solar rack support according to an embodiment of the present invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Figure 2:
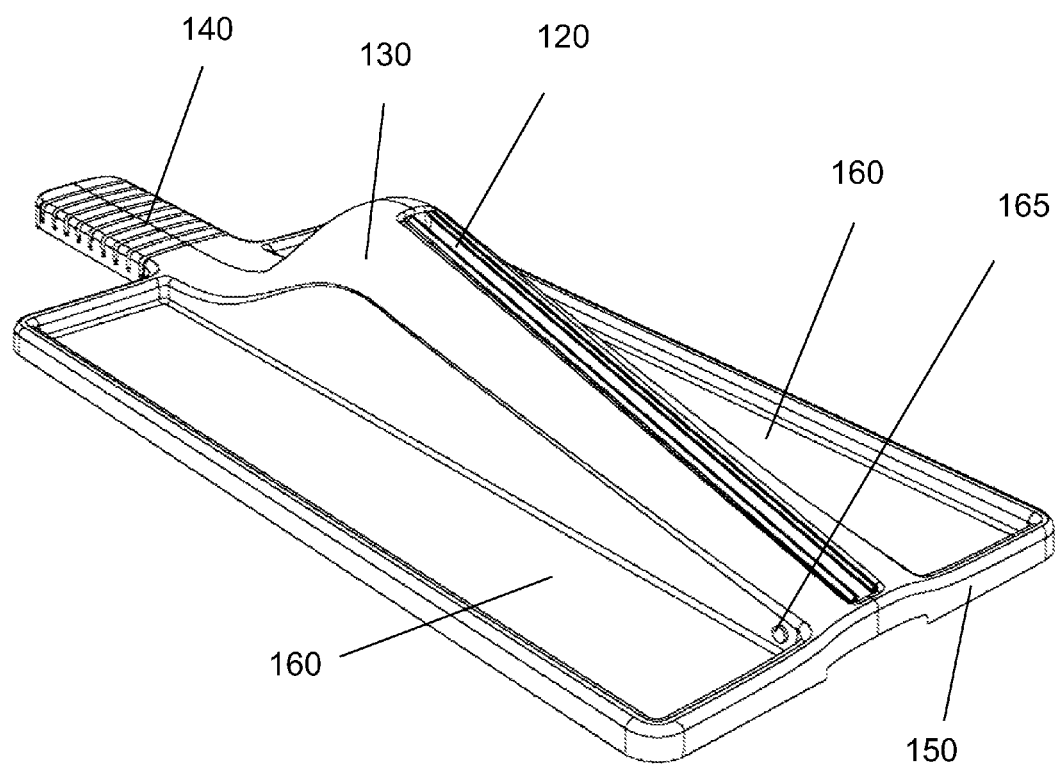
FIG. 2 is a perspective drawing of the modular solar rack support shown in FIG. 1 without ballast.
Figure 3:
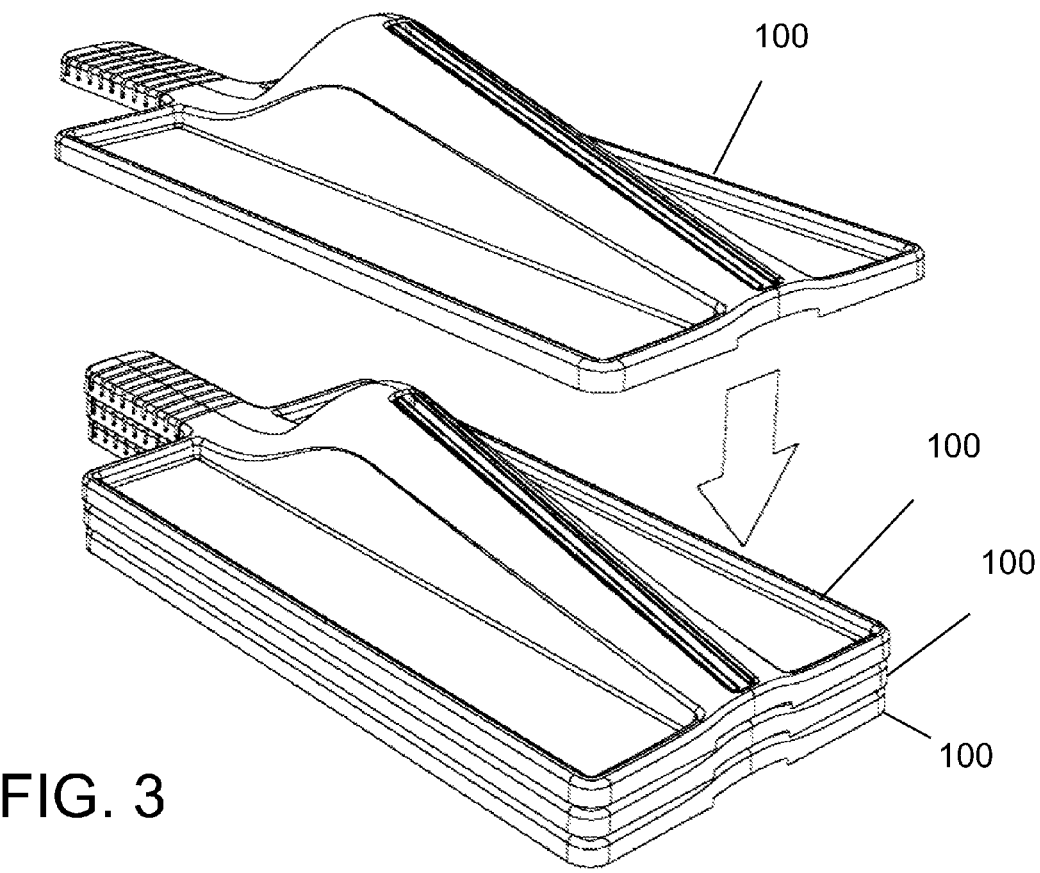
FIG. 3 is a perspective drawing of a stack of the modular solar rack supports shown in FIG. 1.

Referring to FIGS. 1, 2 and 3, a modular solar rack support 100 is shown having a base portion 150, a ballast holding portion 160, a strut 140 and a wedge portion 130. A uni-strut track 120 is disposed along the upper surface of wedge portion 130. A plurality of ballasts 110 are placed on ballast holding portion 160 to hold supports 100 down. A bolt 165 is used to secure another support 100 when assembled with multiple rows.

Support 100 is made of plastic such as high density polyethylene with UV resistant additives to resist solar breakdown. Of course other suitable materials may be used such as metal, wood or composite materials. Additionally, support 100 may be manufactured by an injection process to form a hollow structure as is known in the art. In one embodiment, the hollow portion may be filled with a ballasting material such as water or sand. Additionally, parts of support 100 may be of different materials such as a metal strut 140 attached to a plastic support 100. In FIG. 3, supports 100 are shown stacked together for compact and easy storage and transportation.

Figure 4:
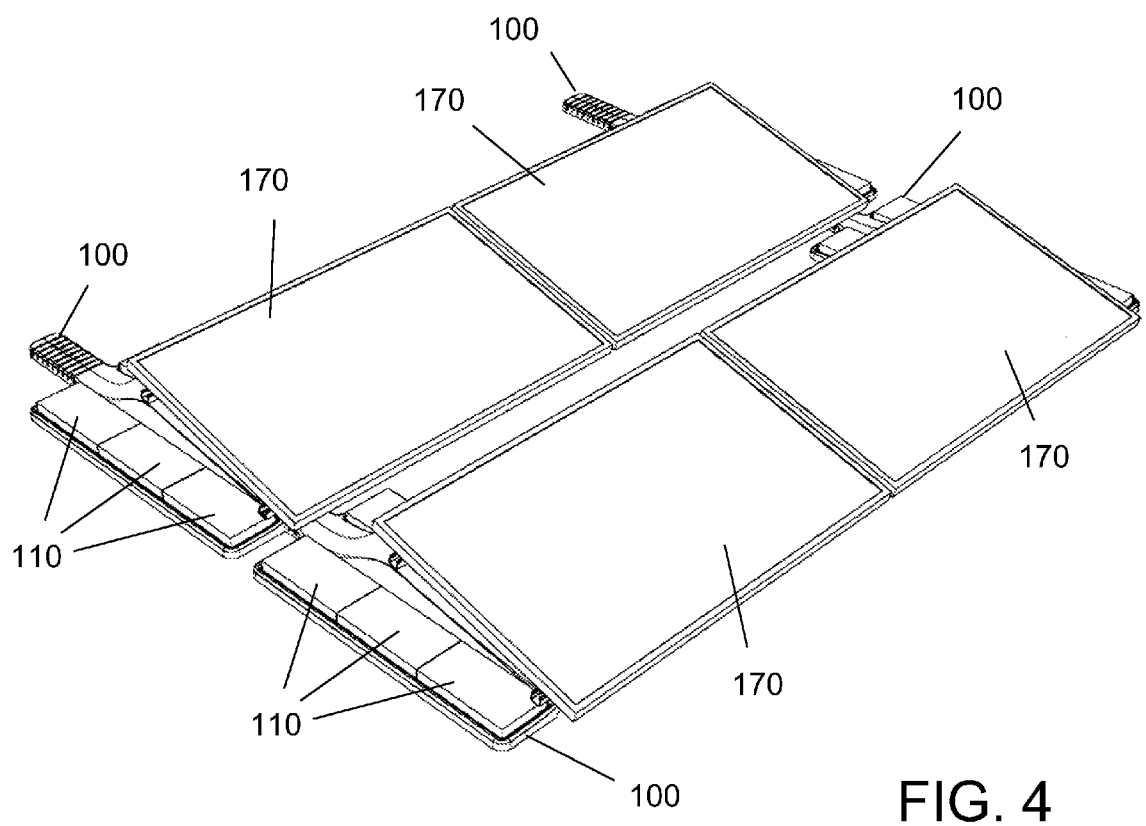
FIG. 4 is a perspective drawing of a typical installation of solar panels using the supports shown in FIG. 1.
Figure 5:
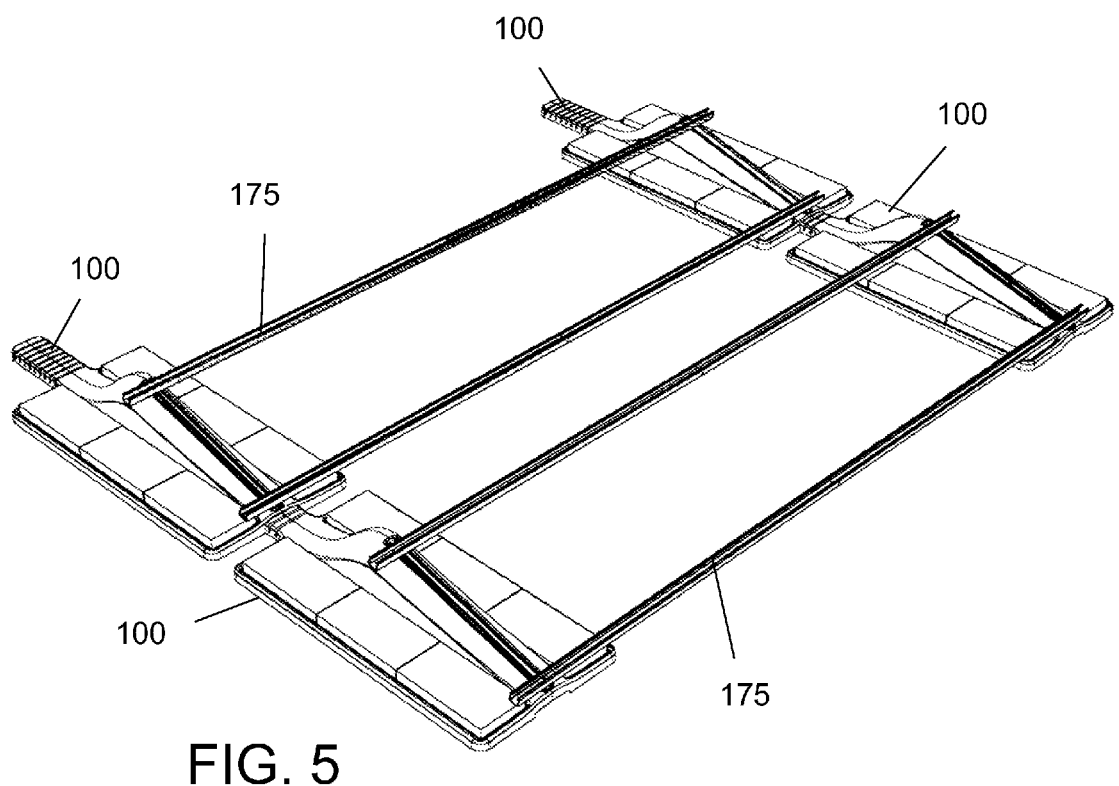
FIG. 5 is a perspective drawing showing the support mounts in an installation according to an embodiment of the present invention.

Referring now to FIGS. 4 and 5, a typical installation according to an embodiment of the present invention is shown having a plurality of supports 100 held in place using ballasts 110. Ballast 110 may be concrete, cement, rock, metal or even a fluid filled container. Uni-strut track 175 is attached to supports 100 and solar panels 170 are attached therein. Attachment of solar panels 170 is accomplished using standard attachment means such as bolts, tees, connectors, etc. as is known in the art.

Figure 6:
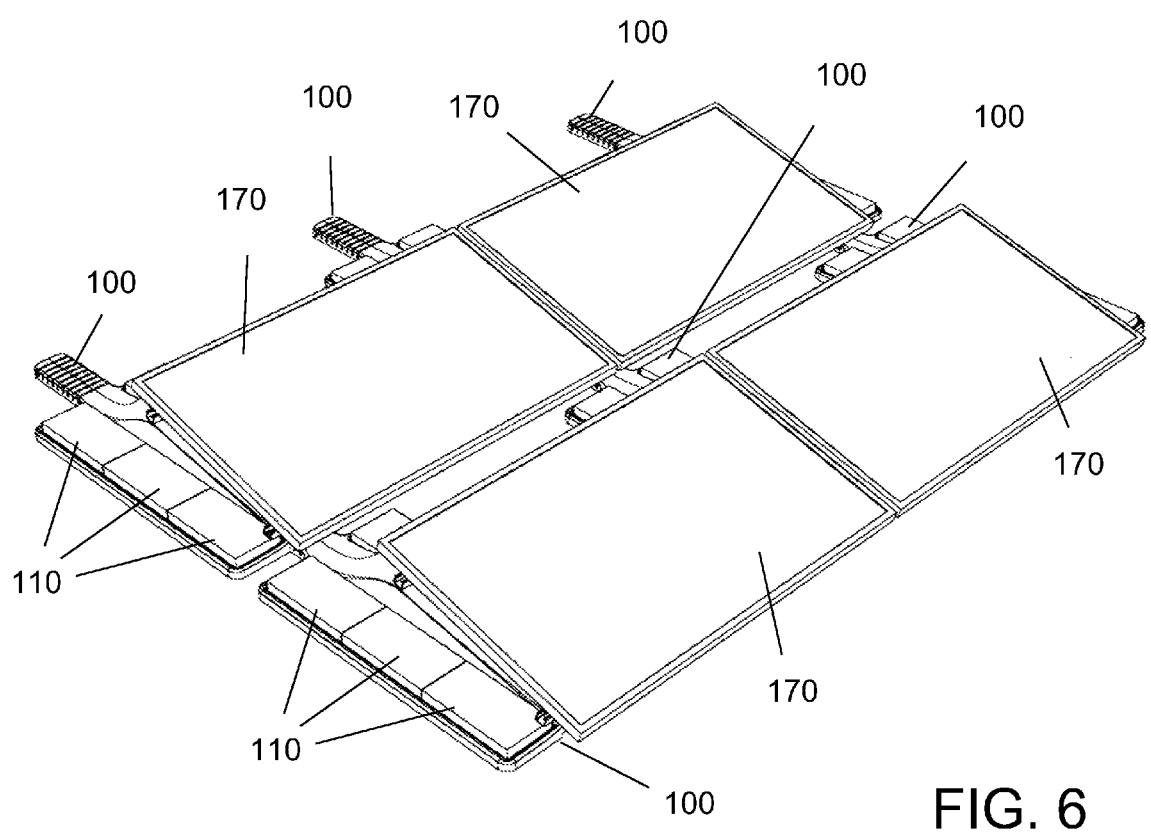
FIG. 6 is a perspective drawing illustrating an alternative installation according to an embodiment of the present invention.
Figure 7:
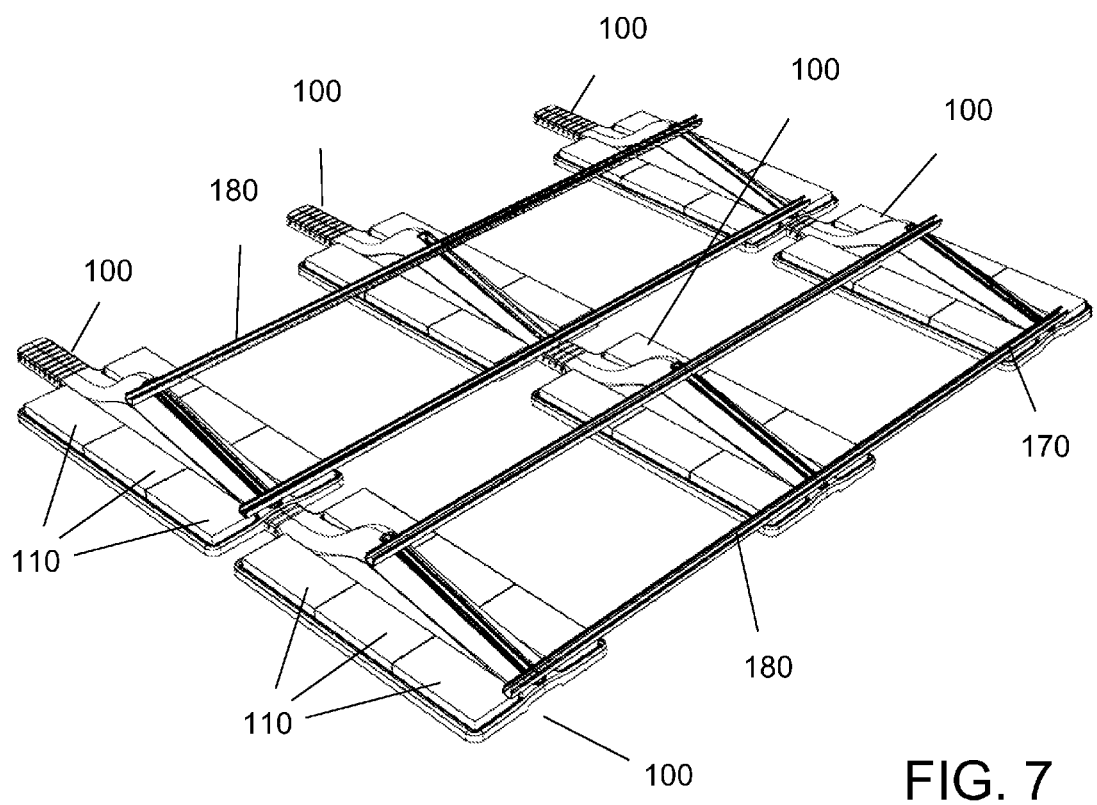
FIG. 7 is a perspective drawing showing the support mounts in the installation shown in FIG. 6.
Figure 8:
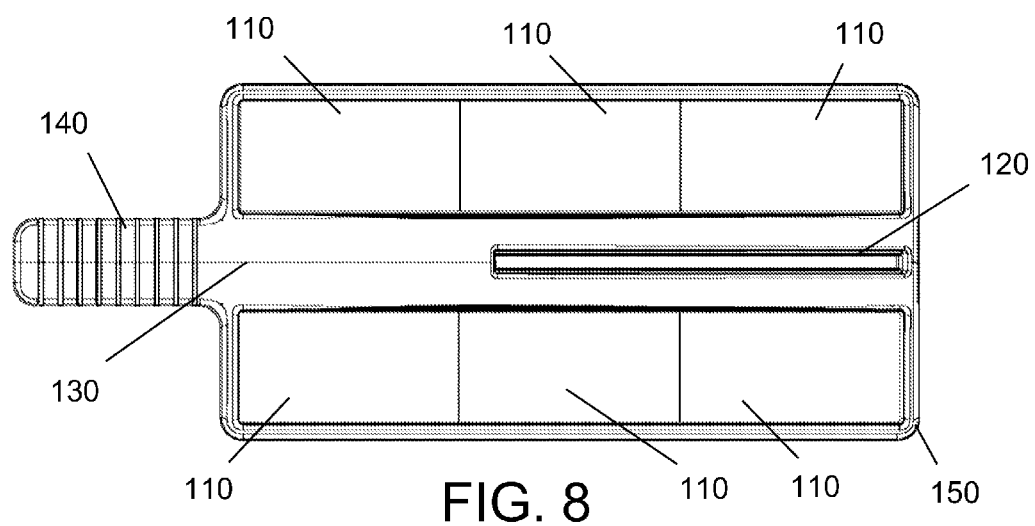
FIG. 8 is a top view of a modular solar rack support shown in FIG. 1.
Figure 9:
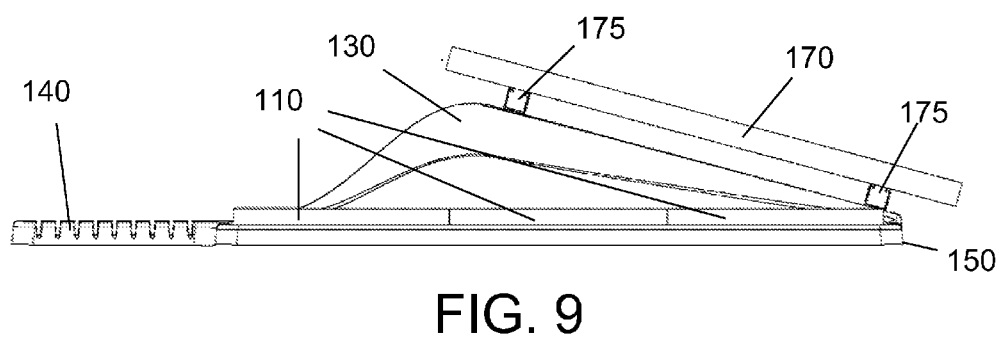
FIG. 9 is a side view of the modular solar rack support shown in FIG. 1.

The embodiment shown in FIGS. 6 and 7, illustrate and installation using a plurality of supports 100 to span a distance greater than shown in FIGS. 4 and 5. A longer uni-strut frame 180 is shown attached to supports 100.

Referring now to FIGS. 4 through 9, each support 100 may be connected to another by fitting a forward portion of base 150 of support 100 to one of a plurality of grooves disposed in strut 140. Length adjustments are accomplished by selecting an appropriate groove matching the application.

Now referring to FIGS. 10 through 14 and 19, a modular solar rack support 200 is shown having a base portion 250, a ballast holding portion 210, a forward lift section 287 and a rearward lift section 285. A strut 240 is provided for interconnectivity. A front portion of base portion 250 fits within one of a plurality of grooves disposed in strut 240. Length adjustments are accomplished by selecting an appropriate groove matching the application. Bolts may be used to secure supports 200 to each other.

A plurality of ballasts 210 fit within ballast holding portion 210 and are used to hold down supports 200. Ballast 210 may be concrete, cement, rock, metal or even a fluid filled container. A clamping portion 275 is provided to support a plurality of solar panels 270. Solar panels 270 are supported with a uni-strut frame as shown in FIGS. 5 and 7. Supports 200 are shown stacked together for transport and storage in FIG. 19.

Figure 10:
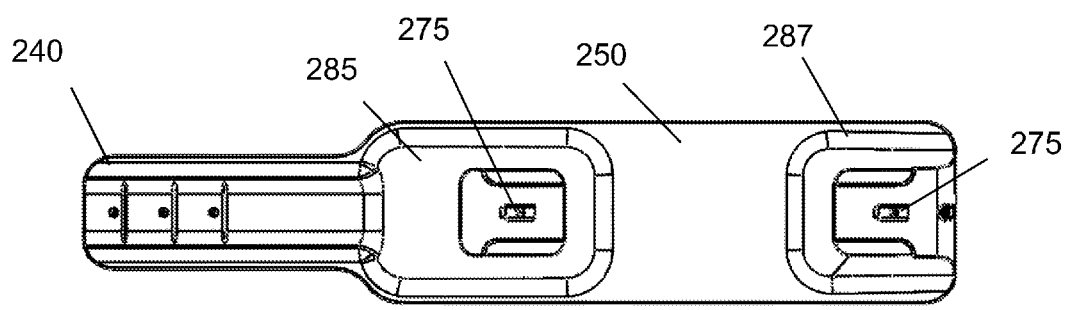
FIG. 10 is a top view of a modular solar rack support according to an embodiment of the present invention.
Figure 11:
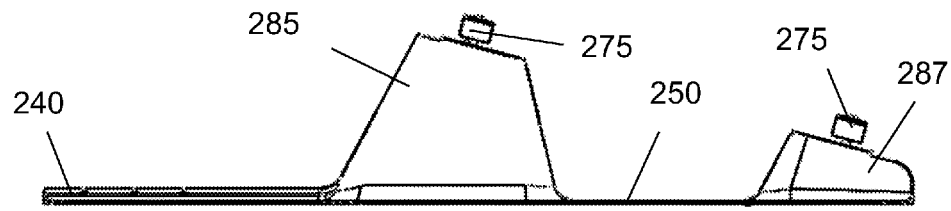
FIG. 11 is a side view of the modular solar rack support shown in FIG. 10.
Figure 12:
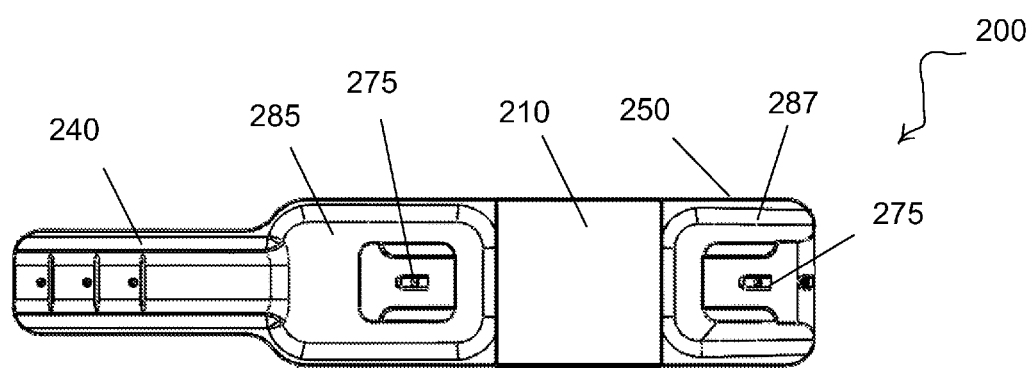
FIG. 12 is a top view of the modular solar rack support shown in FIG. 10 with ballasts.
Figure 13:
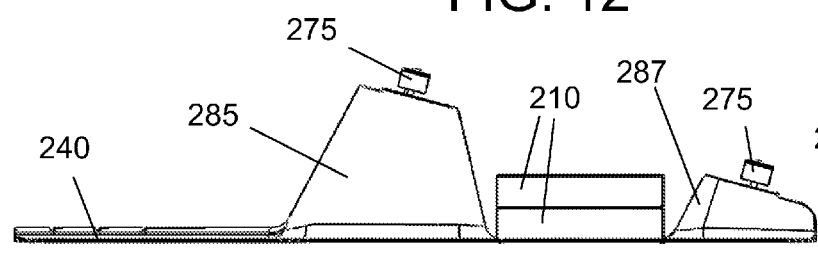
FIG. 13 is a side view of the modular solar rack support shown in FIG. 10 with ballasts.
Figure 14:
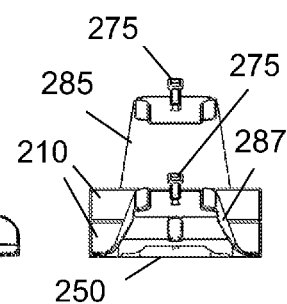
FIG. 14 is a front view of the modular solar rack support shown in FIG. 10 with ballasts.
Figure 15:
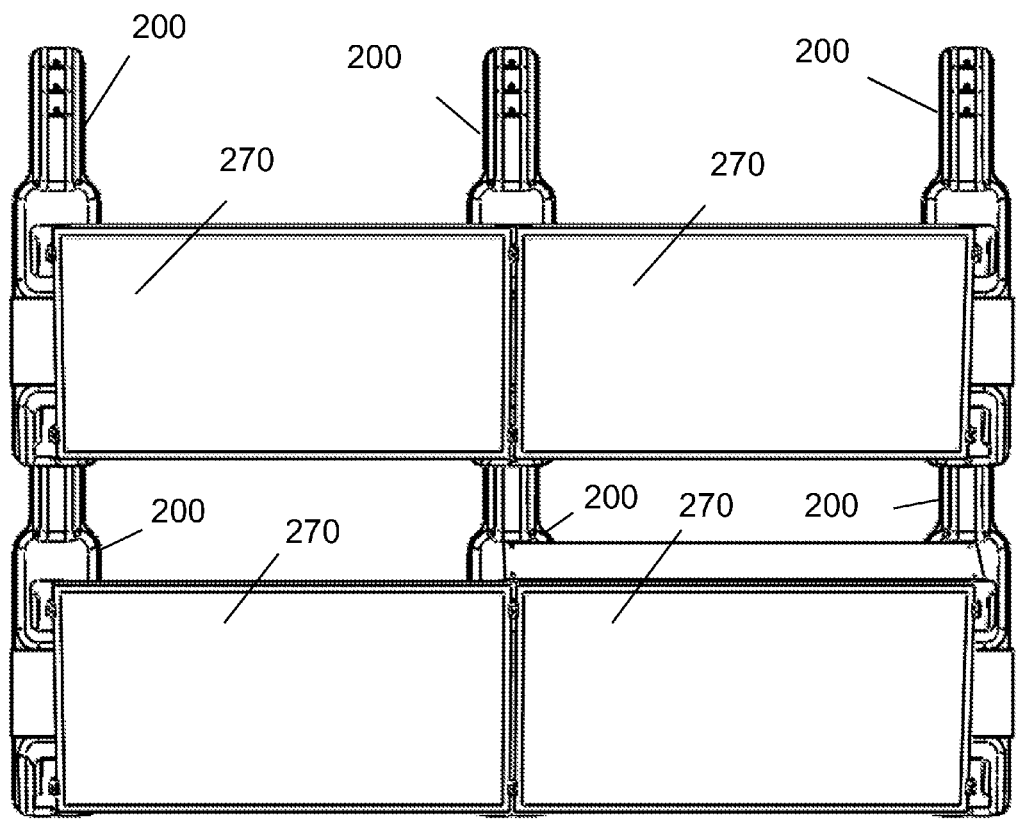
FIG. 15 is a top view of a typical installation of solar panels using the supports shown in FIG. 10.
Figure 16:
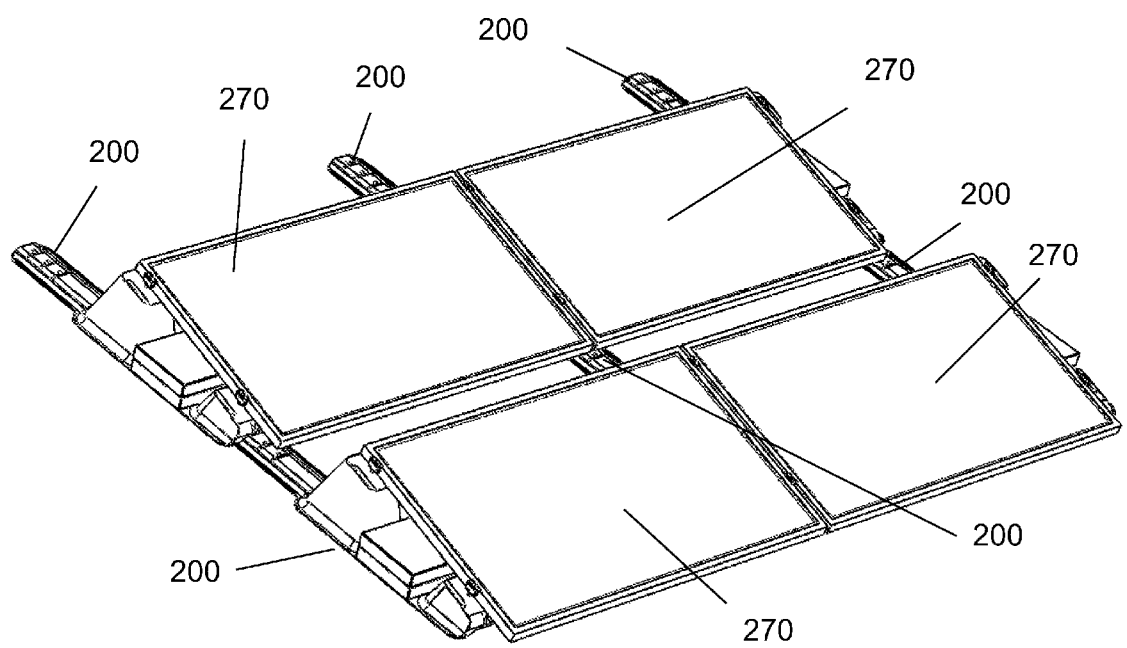
FIG. 16 is a perspective drawing of a typical installation of solar panels using the supports shown in FIG. 10.
Figure 17:
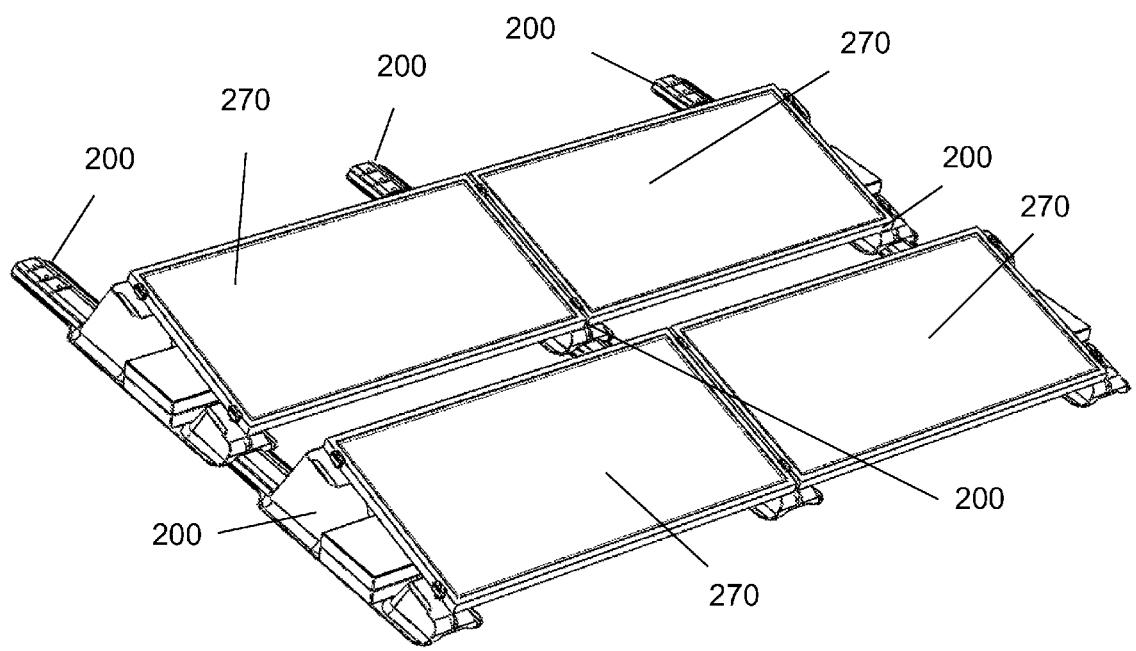
FIG. 17 is a perspective drawing of a typical installation of solar panels using the supports shown in FIG. 10.
Figure 18:
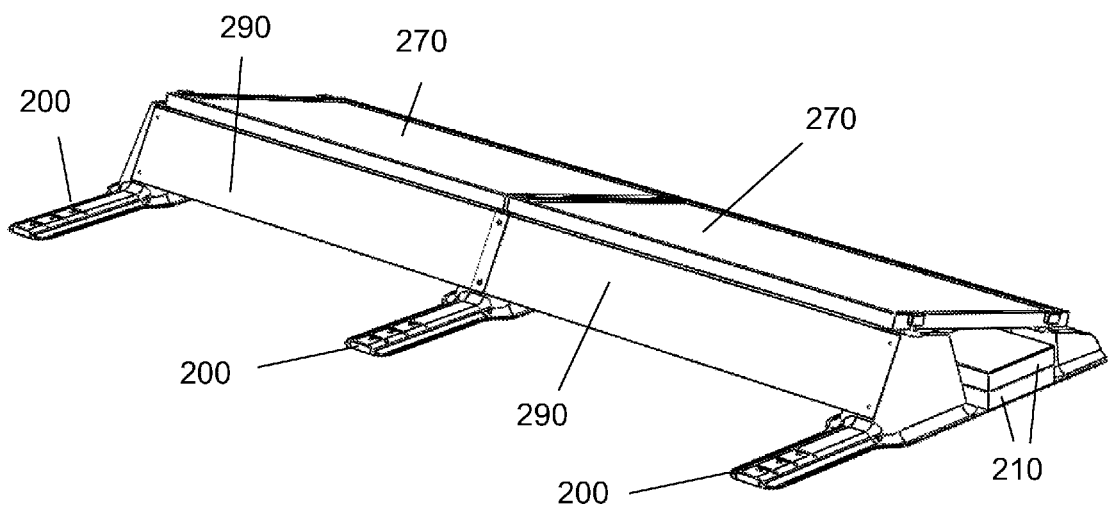
FIG. 18 is a perspective drawing of a typical installation of solar panels using the supports shown in FIG. 10 with wind deflectors.
Figure 19:
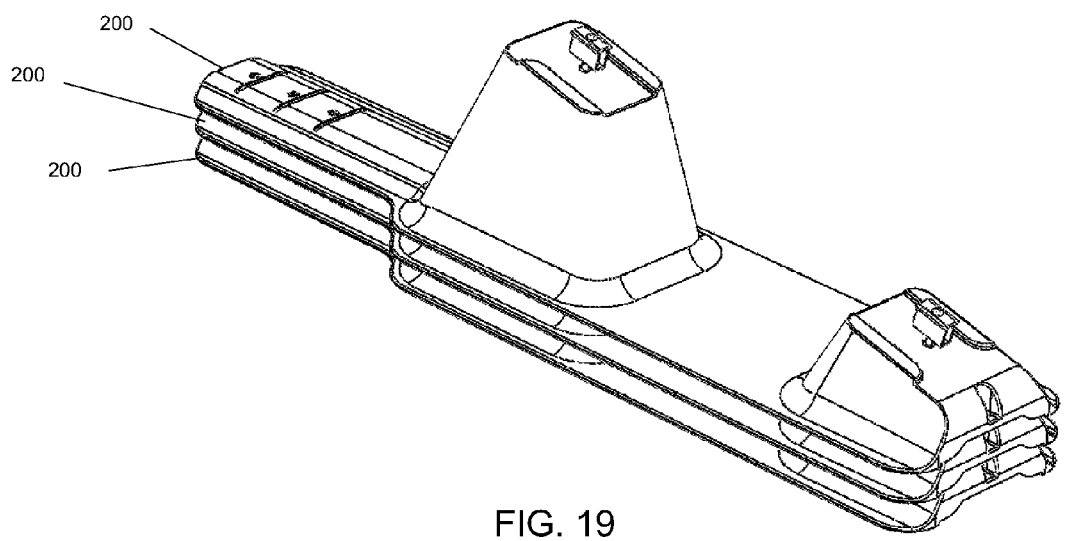
FIG. 19 is a perspective drawing of a stack of the modular solar rack supports shown in FIG. 10.

Referring now to FIGS. 10 and 18, optional wind deflectors 290 are installed on a portion of rearward lift 285 to provide aerodynamic stability by deflecting wind over the surface of solar panels 270. This suppresses the tendency of the wind to lift the panels 270. Wind deflector 290 may be attached with bolts, screws, adhesives or any other suitable method.

Referring to FIGS. 14 through 17, a typical installation according to an embodiment of the present invention is shown having a plurality of supports 200 held in place using ballasts 210. A Uni-strut track (not shown) is attached to supports 200 and solar panels 270 are attached therein. Attachment of solar panels 270 to the uni-strut frame is accomplished using standard attachment means such as bolts, tees, connectors, adhesives, etc. as is known in the art.

Recycled plastics may be used to manufacture the modular solar racking supports to provide an environmentally friendly product. Installation on site only requires a torque wrench to tighten the provided clamping bolts and connectors. The present invention is much less complicated, efficient and easy to install than traditional solar installations.

The supports may be fabricated locally utilizing locally recycled plastics. A sheet is placed in a female mold after being heated. The resulting unit is trimmed and stacked. All hardware required for assembly on-site is attached and provided. The units are stacked on a pallet and shipped either directly to the job site or to a distributor. The units are light weighing approximately 8 lbs each although other sizes and weights are suitable as is appreciated by one skilled in the art. The ability to stack reduces shipping costs and carbon footprint. The units can be either craned on to the roof or carried.

The installation typically requires 2 people. The installation requires a tightening a total of 3 bolts with a torque wrench. The bolts and hardware, which uses a standard "T" fitting, come pre-assembled on the support. The supports are generally evenly spaced depending on the width of the solar panels used. The first row is positioned and the $2^{nd}$ row is attached to the first row by means of a threaded bolt through the strut of the first row. The panels are installed. A torque wrench is used to ensure that the proper amount of pressure is applied to secure the panel. In conjunction with the installation of the panels, the ballast is positioned on the ballast holding portion.

Figure 20:
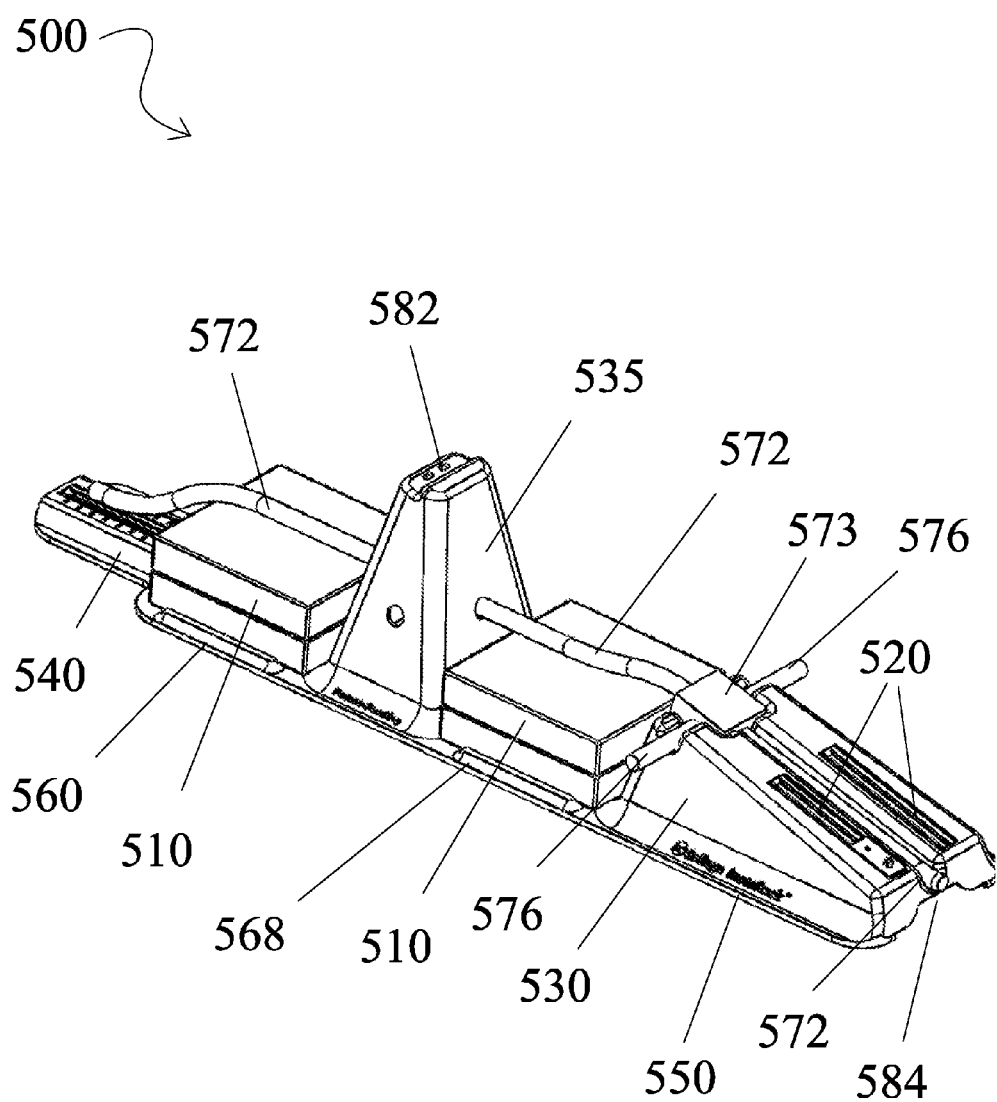
FIG. 20 is a perspective drawing of a modular solar rack support.
Figure 21:
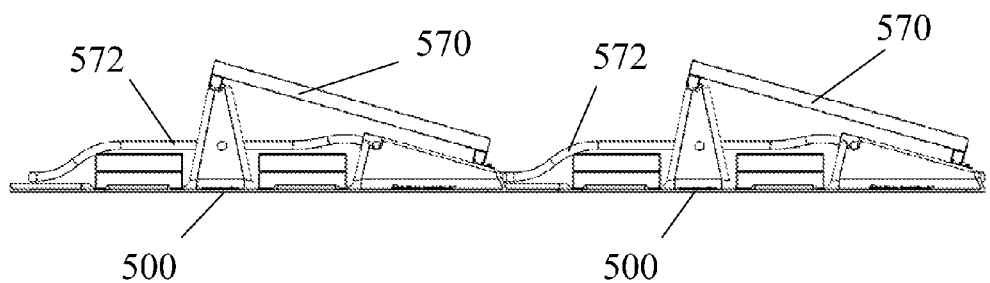
FIG. 21 is a side view of the modular solar rack support shown in FIG. 20.

Referring to FIGS. 20 and 21, a modular solar rack support 500 is shown having a base portion 550 with a wedge 530 and a riser 535. Riser 535 has a connecting bracket 582 disposed along its top portion. A pair of uni-strut tracks 520 are disposed along an upper surface of wedge 530. A connecting strut 540 is provided to interconnect solar rack supports 500 to each other as discussed above regarding connecting struts 140 and 240 respectively. Of course it is not required to have more than one track as long as a solar panel 570 can be attached thereon.

Two ballast holding portions 560 and 568 respectively are provided to allow ballasts 510 to be placed there to hold down modular solar rack support 500 by the weight of ballasts 510 as described above. All electrical wiring is contained within conduit 572 and is joined to other supports 500 using a junction box 573 and perpendicular conduit 576 as is known in the art. Conduit 572 fits within grooves formed in supports 500. Of course other means may be used to secure the conduit as long as the wiring is protected.

Figure 23:
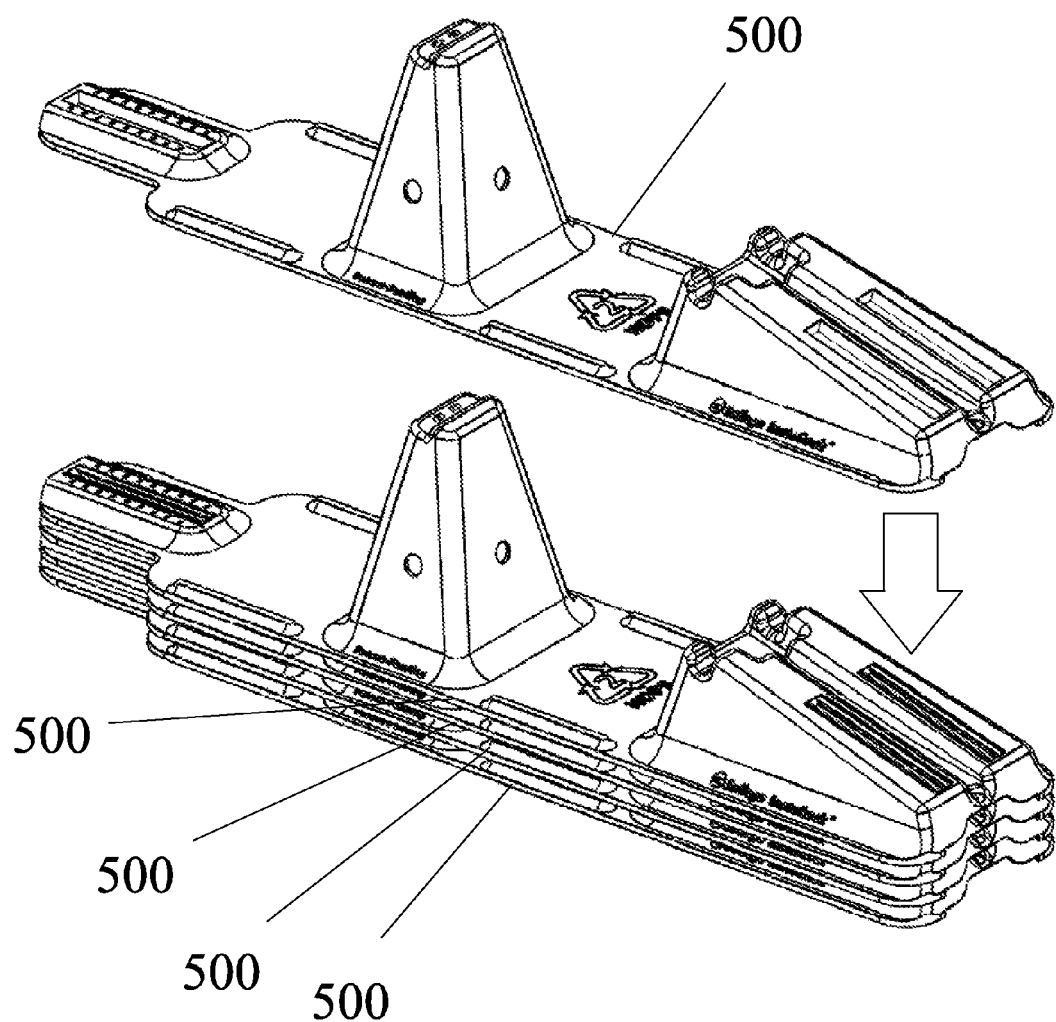
FIG. 23 is a perspective drawing of a stack of the modular solar rack supports shown in FIG. 20.

Referring now to FIG. 23, a plurality of modular solar rack supports 500 are shown stacked together for easy transport and storage as discussed above. Again as discussed above, supports 500 are made of a high impact plastic that is capable of being formed in a single process such as vacuum forming, but it is understood that other materials and manufacturing processes may be used as is known in the art.

Figure 22:
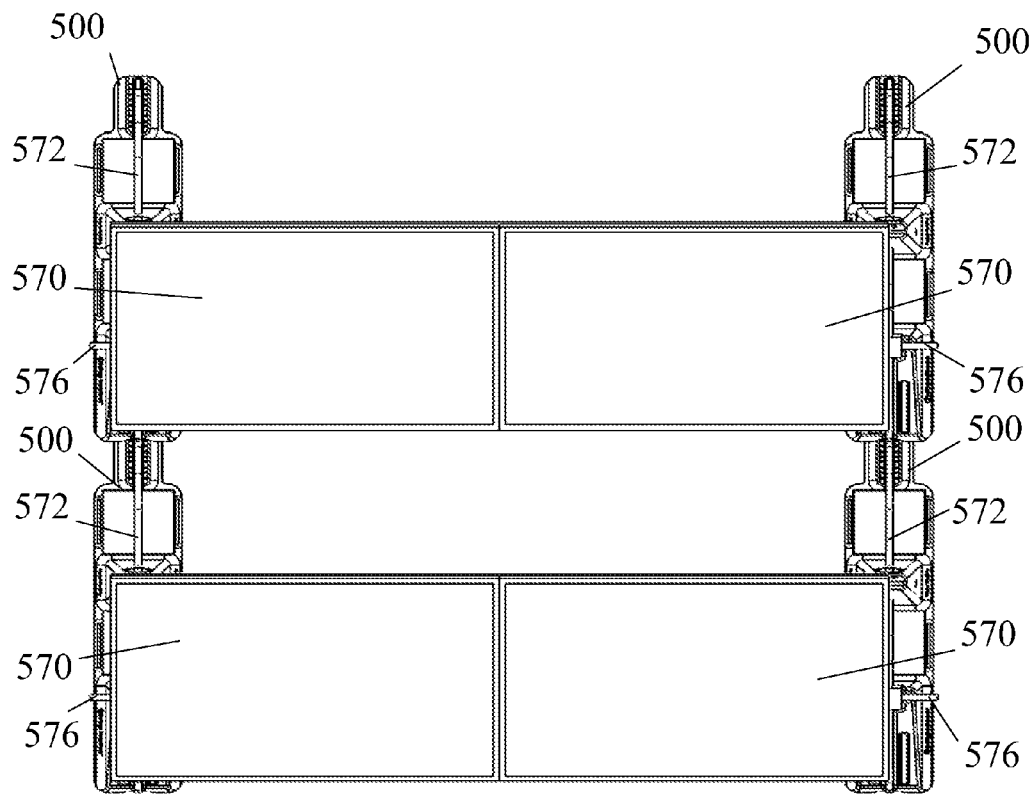
FIG. 22 is a top view of a typical installation of solar panels using the supports shown in FIG. 20.
Figure 24:
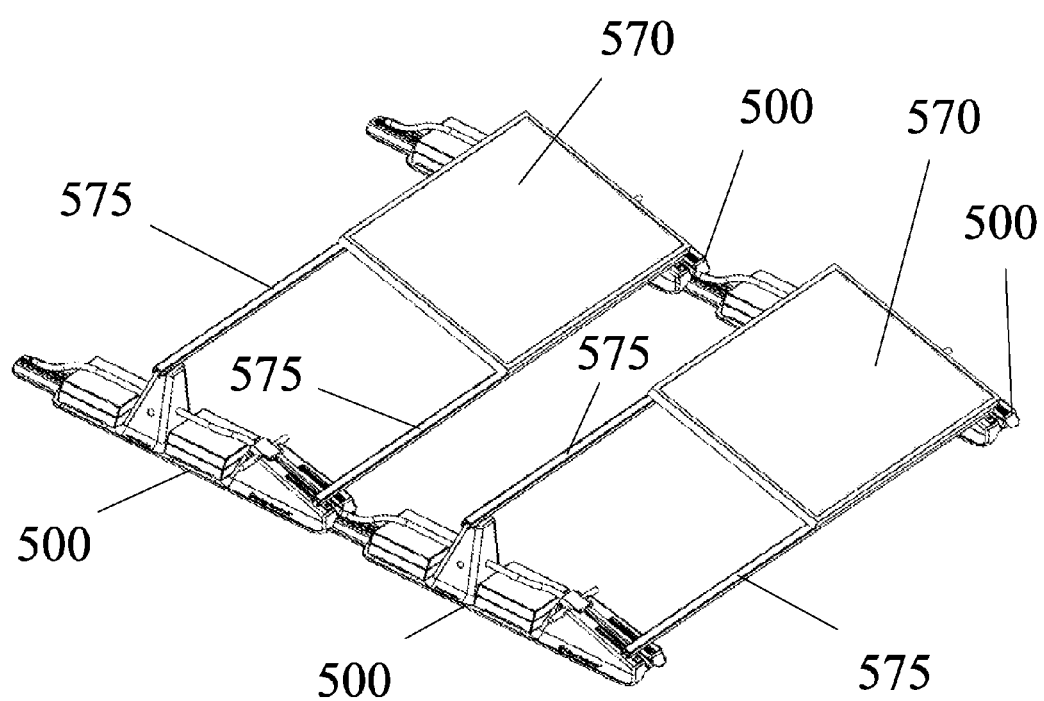
FIG. 24 is a perspective drawing of a typical installation of solar panels using the supports shown in FIG. 20.

Now referring to FIGS. 22 and 24, a plurality of modular solar racks supports 500 which are connected together to hold a plurality of solar panels 570. As shown in the figures, conduits 572 and 576 are used to connect each solar panel 570 together. Tracks 575 are used to connect solar panels 570. The lower track 575 may be adjusted along tracks 520 to accommodate a variety of sizes.

Figure 25:
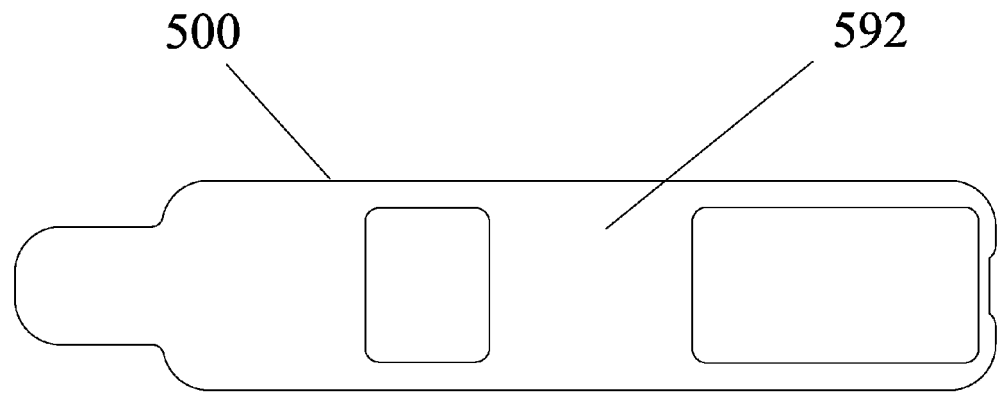
FIG. 25 is a bottom view of the modular solar rack support shown in FIG. 20 having an adhesive membrane attached therein.
Figure 26:
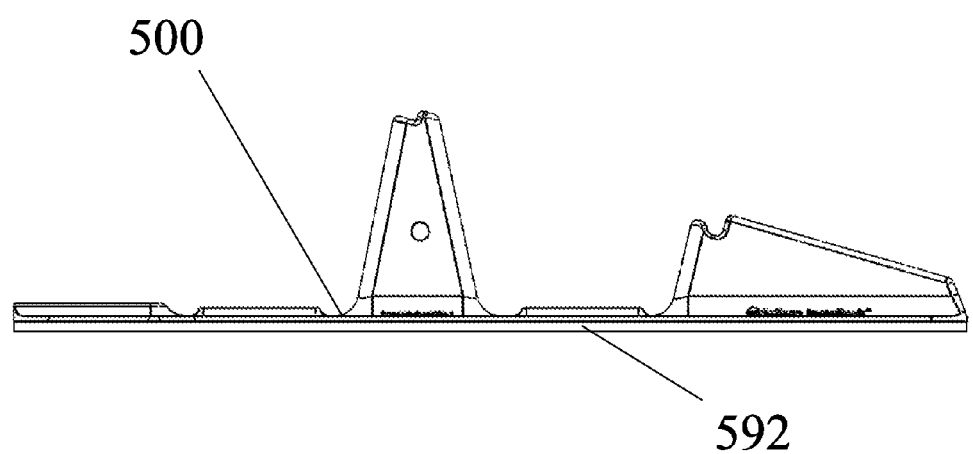
FIG. 26 is a side view of the modular solar rack support shown in FIG. 25.

Referring now to FIGS. 25 and 26, modular solar rack support 500 is shown having an adhesive membrane 592 attached to the bottom portion of base portion 550. Adhesive membrane 592 is used to adhere support 500 to a surface (not shown) to provide a secure and stable platform. A single ply roof membrane may be used to provide this functionality.

Although the instant invention has been described in relation to particular embodiments thereof, many other variations and modifications and other uses will become apparent to those skilled in the art.

What is claimed is:

1. A modular solar rack support comprising:
a base portion;
a wedge portion disposed at one end of said base portion;
a riser centrally disposed on said base portion;
an upper connecting bracket disposed on a top surface of said riser;
at least one lower connecting bracket attached to an upper surface of said wedge portion;
a connecting strut disposed on an end of said base portion;
a connecting strut opening disposed on a other end of said base portion wherein another connecting strut fits therein to connect at least two said modular solar rack supports; and
said modular solar rack support adapted to fit within said another rack support to provide stackability.

2. The modular solar rack support of claim 1 further comprising a plurality of locking grooves perpendicularly disposed along said connecting strut wherein said connecting strut opening fits therein to lock said modular solar rack therein.

3. The modular solar rack support of claim 1 further comprising at least one solar panel attached to said upper and lower connecting brackets.

4. The modular solar rack support of claim 1 further comprising an adhesive membrane disposed along a bottom surface of said base portion wherein said adhesive membrane attaches to a selected surface.

5. The modular solar rack support of claim 1 further comprising at least one ballast holding portion disposed along an upper surface of said base portion adapted to hold at least one ballast wherein said modular solar rack support is stabilized by the weight of said at least on ballast.

6. A modular solar racking system comprising:
at least two modular solar rack supports;
each of said at least two modular solar rack supports comprises a base portion; a wedge portion disposed at one end of said base portion; a riser centrally disposed on said base portion, at least one ballast holding portion disposed between said riser and said wedge portion; an upper connecting bracket disposed on a top surface of said riser; at least one lower connecting bracket attached to an upper surface of said wedge portion; a connecting strut disposed on an end of said portion; a connecting strut opening disposed on a other end of said base portion wherein another connecting strut fits therein to connect at least two said modular solar rack supports; and said modular solar rack support adapted to fit within said another modular rack support to provide stackability;
an upper track connected to said upper connecting brackets;
a lower track connected to said lower connecting brackets; and
at least one solar panel connected to said upper and lower tracks.

* * * * *